US005579520A

United States Patent [19]
Bennett

[11] Patent Number: 5,579,520
[45] Date of Patent: Nov. 26, 1996

[54] SYSTEM AND METHODS FOR OPTIMIZING COMPILED CODE ACCORDING TO CODE OBJECT PARTICIPATION IN PROGRAM ACTIVITIES

[75] Inventor: John G. Bennett, San Mateo, Calif.

[73] Assignee: Borland International, Inc., Scotts Valley, Calif.

[21] Appl. No.: 242,561

[22] Filed: May 13, 1994

[51] Int. Cl.[6] ................................................ G06F 9/45
[52] U.S. Cl. ................................................ 395/704
[58] Field of Search ........................................ 395/700

[56]  References Cited

U.S. PATENT DOCUMENTS 5,418,954  5/1995  Petrus ................................. 395/700

OTHER PUBLICATIONS

Yao, Paul, Tuning The Performance of Windows and OS/2 Programs with MicroQuill's Segmentor, Microsoft System Journal, Mar. 1991, vol. 6, pp. 49(7).
John M. Dlugosz, *DOS Profilers,* Computer Language, Oct. 1989, pp. 81, 82, 84, 87.
Paul M. Sherer, *New Tools Automates Segmenting Process.* (MicroQuill Inc.'s Segmentor Programming Tool) (Product Announcement), PC Week (electronic copy), Jan. 21, 1991, vol. 8, p. 53(1).
Ralph G. Brickner, *Execution Profilers for the PC: Part 2* (Software Review) (Commercial Software Profilers), PC Tech Journal (electronic copy), Feb. 1987, vol. 5, p. 166(6).
Keith W. Boone, *A Source Code Profiler,* Dr. Dobb's Journal, Oct. 1992, pp. 98, 100, 102, 104, 128, 130–131.

*Primary Examiner*—Thomas M. Heckler
*Assistant Examiner*—Dennis M. Butler
*Attorney, Agent, or Firm*—John A. Smart; Michael J. Ritter

[57]  ABSTRACT

A development system having a compiler, a linker, an interface, and a code packing optimization module is described. The compiler generates or "compiles" source listings into object modules, which may be linked or combined with other object modules (e.g., stored in "library" files) to create an executable program. The optimization module embodies activity-based methods for generating a profile bitmap for a program of interest, to identify related code objects (i.e., procedures, functions, routines, and the like) based on clustering of activity bit signatures, so that related ones may be packed together in the executable program. A run of a program to be optimized is divided into a plurality of activities, typically those which are core to the operation of the program. A profile bitmap of the program is generated by running the target program through the various activities: for each code object "hit" during an activity a corresponding bit is set. In this manner, a bit signature is generated for each code object indicating which activities the code object has participated in. These patterns are then ordered, for identifying code objects of the program which should be clustered together. Given this order, related procedures may be located in contiguous or near-contiguous pages of the program by ordering them based on their bitmap signatures. In this manner, the efficiency of information retrieval operations (e.g., disk access, caching, and the like) is maximized.

30 Claims, 11 Drawing Sheets

```
SOURCE_1                              201
// EXTERNS (CALLED IN MODULE)
EXTERN BOOL DRAWRECTANGLE();
EXTERN BOOL DRAWCIRCLE();
EXTERN LONG MY_PROC_D();

// PUBLICS (DEFINED)
INT MY_PROC_A();
INT MY_PROC_B();

INT MY_PROC_A()
{   . . .
    SMALL_AREA = MY_PROC_D();
    DRAWRECTANGLE(SMALL_AREA);
    . . .
}

INT MY_PROC_B()
{   . . .
    MY_PROC_A();
    DRAWCIRCLE(&MY_RAD);
    . . .
}
```

```
SOURCE_2                              203
// EXTERNS (CALLED IN MODULE)
EXTERN BOOL DRAWRECTANGLE();
EXTERN INT MY_PROC_A();

// PUBLICS (DEFINED)
INT MY_PROC_C();
LONG MY_PROC_D();

INT MY_PROC_C()
{   . . .
    MY_PROC_A();
    DRAWRECTANGLE(BIG_AREA);
    . . .
}

LONG MY_PROC_D()
{   . . .
    RETURN (AREA);
}
```

COMPILER 153

```
OBJECT MODULE 1                  211
EXTERN RECORDS:
   1) DRAWRECTANGLE
   2) DRAWCIRCLE
   3) MY_PROC_D

PUBLIC RECORDS:
   1) MY_PROC_A
   2) MY_PROC_B

SOURCE_1.OBJ
      (OMF FORMAT)
```

```
OBJECT MODULE 2                  213
EXTERN RECORDS:
   1) DRAWRECTANGLE
   2) MY_PROC_A

PUBLIC RECORDS:
   1) MY_PROC_C
   2) MY_PROC_D

SOURCE_2.OBJ
      (OMF FORMAT)
```

*FIG. 2A*

PROFILE
BITMAP
300

ACTIVITIES

|   | 1 | 2 | 3 | 4 | 5 | ... | 32 |
|---|---|---|---|---|---|-----|----|
| 1 | 0 | 0 | 1 | 1 | 1 | ... | 0  |
| 2 | 1 | 0 | 0 | 1 | 1 | ... | 0  |
| 3 | 0 | 1 | 0 | 0 | 0 | ... | 1  |
| 4 | 0 | 0 | 0 | 0 | 1 | ... | 1  |
| 5 | 1 | 1 | 1 | 0 | 1 | ... | 0  |
| . | . | . | . | . | . | .   | .  |
| N | 0 | 1 | 1 | 0 | 0 | ... | 1  |

PROCEDURES (row labels)

310 (HITS)

*FIG. 3A*

BIT SLICES
(SIGNATURES)
350

| ACTIVITY: | SIGNATURE: |
|-----------|------------|
| 1         | 0 1 0 0 1 ... 0 |
| 2         | 0 0 1 0 1 ... 1 |
| 3         | 1 0 0 0 1 ... 1 |
| 4         | 1 1 0 0 0 ... 0 |
| 5         | 1 1 0 1 1 ... 0 |
| .         | ... |
| 32        | 0 0 1 1 0 ... 1 |

*FIG. 3B*

PROFILE MULTI-PLANE BITMAP
360

ACTIVITIES

|  | 1 | 2 | 3 | 4 | 5 | ... | 32 |
|---|---|---|---|---|---|---|---|
| 1 | 0 | 0 | 2 | 5 | 3 | ... | 0 |
| 2 | 3 | 0 | 0 | 9 | 3 | ... | 0 |
| 3 | 0 | 1 | 0 | 0 | 0 | ... | 6 |
| 4 | 0 | 0 | 0 | 0 | 16 | ... | 3 |
| 5 | 8 | 5 | 3 | 0 | 2 | ... | 0 |
| . | . | . | . | . | . | . | . |
| N | 0 | 3 | 7 | 0 | 0 | ... | 19 |

PROCEDURES (row labels)

370 (COUNTS)

*FIG. 3C*

MULTI-PLANE BIT SLICES (SIGNATURES)
380

| ACTIVITY: | SIGNATURE: |
|---|---|
| 1 | 00 03 00 00 08 ... 00 |
| 2 | 03 00 00 09 03 ... 00 |
| 3 | 00 01 00 00 00 ... 06 |
| 4 | 00 00 00 00 16 ... 03 |
| 5 | 08 05 03 00 02 ... 00 |
| . | ... |
| 32 | 00 03 07 00 00 ... 19 |

*FIG. 3D*

*INVERTED BIT SLICES*
*(PROC. SIGNATURES)*
*355*

| PROCEDURE: | SIGNATURE:<br>(ACTIVITIES PARTICIPATED IN) |
|---|---|
| 1 | 0 0 1 1 1 ... 0 |
| 2 | 1 0 0 1 1 ... 0 |
| 3 | 0 1 0 0 0 ... 1 |
| 4 | 0 0 0 0 1 ... 1 |
| 5 | 1 1 1 0 1 ... 0 |
| ⋮ | ... |
| N | 0 1 1 0 0 ... 1 |

*FIG. 3E*

| PROCEDURE: | SIGNATURE CLUSTERS: | CLUSTERED PROCEDURE SIGNATURES 357 |
|---|---|---|
| 1<br>9<br>23<br>27<br>31 | 0 0 1 1 1 ... 0<br>0 0 1 1 1 ... 0<br>0 0 1 1 1 ... 0<br>0 0 1 1 1 ... 0<br>0 0 1 1 1 ... 0 | PROCEDURE CLUSTER A |
| 2<br>13<br>17<br>43<br>59<br>65 | 1 0 0 1 1 ... 0<br>1 0 0 1 1 ... 0<br>1 0 0 1 1 ... 0<br>1 0 0 1 1 ... 0<br>1 0 0 1 1 ... 0<br>1 0 0 1 1 ... 0 | PROCEDURE CLUSTER B |
| 3<br>40<br>44<br>45 | 0 1 0 0 0 ... 1<br>0 1 0 0 0 ... 1<br>0 1 0 0 0 ... 1<br>0 1 0 0 0 ... 1 | PROCEDURE CLUSTER C |
| 4<br>19<br>30<br>36<br>37<br>38<br>52<br>69<br>70<br>78<br>88 | 0 0 0 0 1 ... 1<br>0 0 0 0 1 ... 1<br>0 0 0 0 1 ... 1<br>0 0 0 0 1 ... 1<br>0 0 0 0 1 ... 1<br>0 0 0 0 1 ... 1<br>0 0 0 0 1 ... 1<br>0 0 0 0 1 ... 1<br>0 0 0 0 1 ... 1<br>0 0 0 0 1 ... 1<br>0 0 0 0 1 ... 1 | PROCEDURE CLUSTER D |
| 5<br>12<br>18<br>32 | 1 1 1 0 1 ... 0<br>1 1 1 0 1 ... 0<br>1 1 1 0 1 ... 0<br>1 1 1 0 1 ... 0 | PROCEDURE CLUSTER E |
| ... | ... | |
| 21<br>28<br>39<br>73<br>85<br>110<br>112<br>149<br>N | 0 1 1 0 0 ... 1<br>0 1 1 0 0 ... 1<br>0 1 1 0 0 ... 1<br>0 1 1 0 0 ... 1<br>0 1 1 0 0 ... 1<br>0 1 1 0 0 ... 1<br>0 1 1 0 0 ... 1<br>0 1 1 0 0 ... 1<br>0 1 1 0 0 ... 1 | PROCEDURE CLUSTER X |

*FIG. 3F*

SYSTEM AND METHODS FOR OPTIMIZING COMPILED CODE ACCORDING TO CODE OBJECT PARTICIPATION IN PROGRAM ACTIVITIES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of development systems for computers and, more particularly, to systems and methods for compiling source programs into object modules and linking those modules into programs executable by computers.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. Most of the high-level languages currently used for program development exploit the concept of modularity whereby a commonly required set of operations can be encapsulated in a separately named subroutine, procedure, or function; these terms will be used interchangeably herein to represent any type of discrete code objects. Once coded, such subroutines can be reused by "calling" them from any point in the main program. Further, a subroutine may call a subsubroutine, and so on, so that in most cases an executing program is seldom a linear sequence of instructions.

In the C language, for example, a main() program is written which calls a sequence of functions, each of which can call functions, and so on. The essence of a function call is that the calling function (caller) passes relevant data as arguments (or parameters) to the target function (callee), transfers control to the memory section holding the function's executable code, returns the result of the call, and at the same time, stores sufficient information to ensure that subsequent execution resumes immediately after the point where the original function call was made. This approach allows developers to express procedural instructions in a style of writing which is easily read and understood by fellow programmers.

A program called a "compiler" translates these instructions into the requisite machine language. In the context of this translation, the program written in the high-level language is called the "source code" or source program. The ultimate output of the compiler is an "object module," which includes instructions for execution by a target processor. Although an object module includes code for instructing the operation of a computer, the object module itself is not in a form which may be directly executed by a computer. Instead, it must undergo a "linking" operation before the final executable program is created.

Linking may be thought of as the general process of combining or linking together one or more compiled object modules to create an executable program. This task usually falls to a program called a "linker." In typical operation, a linker receives, either from the user or from an integrated compiler, a list of object modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (typically an .EXE file) which, after testing and quality assurance, is passed to the user with appropriate installation and usage instructions.

Ideally, when a compiler/linker development system translates a description of a program and maps it onto the underlying machine-level instruction set of a target processor, the resulting code should be at least as good as can be written by hand. In reality, code created by straightforward compilation and linking rarely achieves its goal. Instead, tradeoffs of slower performance and/or increased size of the executing application are often incurred. Thus while development systems simplify the task of creating meaningful programs, they rarely produce machine code which is not only the most efficient (smallest) in size but also executes the fastest.

One approach for improving the machine-level code generated for a program is to employ an execution profiler for analyzing the code, looking for any significant performance bottlenecks. Using a profiler, a developer can determine: how many times a particular section of code is executed (i.e., function is called, loop is iterated, and the like) and how long does it take to execute a particular passage of code. A passage executed a million times during operation of a program deserves more attention than one executed only once or twice. Improvements in the former typically have a profound effect on overall program performance, while improvements in the latter probably would yield only marginal improvements.

Profilers typically employ one of two approaches for analyzing a program. In the first approach, the profiler periodically interrupts the program's operation and checks the current location of the program counter. The results are scored using statistical methodology. Although the approach is not difficult to implement, the results are not particularly good. For instance, sections of code which may be of interest might be too small to be sampled accurately. Also, the approach cannot tell reliably how many times a passage was employed. The second approach is to start a system timer when the program reaches a passage of interest and stop the timer when the program leaves the passage. The approach is harder to implement but generally leads to more accurate analysis of the program.

Another avenue for improving performance of a program, one which is of particular interest to the present invention, is optimization of the ordering or layout of various procedures which comprise the executable program. Consider, for instance, programs running under Microsoft MS-DOS on an Intel 80×86-class computer. In the Intel architecture, a program code is organized into discrete blocks of executable code or "code segments." A call from a procedure (subroutine, function, or the like) in one code segment to another procedure residing in a different code segment ("far" call) is computationally more expensive than an intersegment or "near" call (since the CPU must load new segment descriptor information). A program with its procedures arranged within a few large segments requires fewer far calls than if the same program were implemented with many small segments and, thus, generally performs better. Thus, developers for MS-DOS programs may optimize performance by minimizing the number of segments in their programs, in order to minimize the number of intersegment or "far" calls.

Consider, in contrast, programs running under Microsoft Windows on an Intel 80×86-class computer. In a Windows environment, code segments can be dynamically loaded, moved, linked, and discarded. Developers tend to create programs comprising many smaller code segments. Such a program requires less memory than a corresponding version of that program with fewer large segments (as it is easier for the operating system to discard or swap out unused portions of the program). As code segments are needed, they are read from the storage device. When available memory gets low, on the other hand, code segments which are no longer needed are discarded to free up memory.

The foregoing approach is not without drawbacks, however. As more code segments are employed, the likelihood increases that a function or procedure call will be a far call. Moreover, the likelihood increases that a call will be to a procedure which is not yet in memory. Most users of Windows programs are familiar with "thrashing"—a condition in which a program repetitively accesses a storage device before completion of its current task (e.g., storing a spreadsheet file). Here, the current execution path requires execution of procedures strewn across various code segments, ones which cannot all be loaded into available memory. The program must waste time reading, discarding, and re-reading different code segments from the storage device before it executes all the procedures which complete the current task.

Given that programs typically comprise a plurality of interdependent procedures or functions, programs may be optimized by packing together or "clustering" groups of related functions. In this manner, interdependent procedures of a program are more readily available to one another (e.g., stored in the same memory page) at runtime. Although the task of organizing code segments for a program may be done by hand, such an approach is tedious and prone to error. Given the complexity of programs today, it is unlikely that a single developer will understand all of the parts of a large program well enough to do a good job. It is quite easy to optimize one part of a large program at the expense of poor performance in other parts. Accordingly, it is desirable to automate the task of optimizing the ordering of procedures.

A conventional system for optimizing code packing is "Segmentor™," by Microquill. The Segmentor system employs an iterative process to determine the optimal organization of segments in a Windows program. The process entails creating a database of function calls, updating the database with runtime profile data, and analyzing the data with an optimizer. The database stores segmentation data about which functions calls what. Initially, the database stores static call information, based on source files and link data. Dynamic profile data may later be added to fine-tune the segmentation data. At that time, weights are assigned to function calls, based on data gathered during runtime. Using an optimizer, Segmentor™ searches for an optimal segment layout. The results are then provided to a development system (e.g., in the form of compiler/linker directives or "pragmas" statements). These statements control the placement of functions in segments by the compiler/linker.

Although a good first approach, the code packing optimization method employed by Segmentor is, using presently available equipment, particularly time consuming. Optimizing the code packing of a program of even a modest size may require several hours or more. Given the time pressures of modern-day software development, there is little room in the development schedule for use of such a time-intensive tool. Yet given the potential performance benefits of code packing, there remains great interest in developing optimization techniques which do not incur a substantial time penalty in the development cycle.

SUMMARY OF THE INVENTION

The present invention recognizes a need for optimizing the packing of code objects—the procedures, functions, routines, and the like which comprise a computer program—based on analysis of meaningful program activities, such as user-observable tasks. Moreover, the present invention recognizes a need for optimization methodology which does not incur a substantial time penalty in the development of commercial programs.

A preferred embodiment of the present invention comprises a development system having a compiler, a linker, an interface, and an Optimizer. The compiler generates or "compiles" source listings into object modules. In an exemplary embodiment, these are (initially) stored in Object Module Format (OMF) as .OBJ files. These may be linked or combined with other object modules stored in "library" files to create an executable program. The Optimizer embodies activity-based methods for generating a profile bitmap for a program of interest, to find related procedures (based on clustering of activity bit signatures) so that they may be packed together in the final executable program.

A preferred method of the present invention for optimizing the packing of code proceeds as follows. The run (execution) of the program is divided into a plurality of activities, with each activity corresponding to a distinct program activity (e.g., opening a file, closing a file, moving a bitmap, pasting text, and the like). Thus, the program is effectively "sliced" into various activities which are core to the operation of the program. The activities themselves are generally selected to be those which are everyday activities important to the operation of the target program. For a database program, such activities may include, for instance, sorting a database table, printing a report, and the like. For a painting program, on the other hand, such activities may include, for instance, saving a bitmap file, modifying a color palette, cutting/pasting bitmaps, and the like.

Invocation of various code objects or procedures during execution of a given activity is tracked. During invocation of a procedure, program control is transferred to the procedure, the machine code which comprises the procedure is executed. Once the invoked procedure has completed its task, program control is returned back to a point in the program from which the procedure was invoked. Every procedure within the program of interest may be assigned a slot, such as through using debug information; alternatively, system memory may be divided up into small slots (some of which will not correspond to procedures), with marking of those slots which correspond to procedure entry points. Runtime entry into a particular procedure is easily monitored, for example, by hooking to a standard compiler stack-check routine which is invoked during the prolog code of the procedure (i.e., a call to a check routine is made upon runtime entry into the procedure).

A profile bitmap of the program is generated by running (executing) the target program through the various activities. In particular, for each procedure "hit" during an activity a corresponding bit is set in an activity bit set. Thus, each "hit" in the bit set represents that a call has been made to a corresponding procedure of the program, for carrying out the given activity.

Once generation of the profile bitmap has been completed, bit slices may be taken from the bitmap so that a bit signature may be determined for each activity. The bit signature represents a procedure footprint for the activity—an indicator of which procedures were invoked during processing of the particular activity.

The analysis of the resulting data is then inverted as follows. For each procedure, a signature is generated indicating which activities the procedure has participated in. Although the number of unique signatures theoretically possible is quite large (e.g., four billion for tracking 32-bit signature—32 activities), the present invention recognizes that the actual number of distinct signatures generated tends to be far fewer than theoretically possible. Instead, the tendency is towards very few signatures and many repeating signatures (indicating highly correlated procedures). For a large commercial application (e.g., Paradox for Windows or Lotus 1-2-3), the bit signatures are highly correlated, so that there may be as few as fifty different patterns with twelve activities tracked, for instance. Recognizing this, the present invention provides an optimization method which greatly reduces the data set required for optimization analysis.

Analysis of the data set proceeds by ordering the bit signature patterns, for example, in declining count, or by arranging for neighbors to be maximally connected (e.g., applying least distance standard methodology), or by arranging for global maximization of connectivity, or some combination thereof. This process identifies procedures which should be clustered together. Given this order, related procedures may be located in contiguous or near-contiguous pages of the program by ordering them according to the order of their bitmap signatures. The linker receives information (e.g., a procedure order list) from the Optimizer, so that it may emit an executable image with the determined optimized procedure order.

BRIEF DESCRIPTION OF THE DRAWINGS

FIG. 2A is a block diagram illustrating the process (of the development system of FIG. 1C) for compiling source modules into object code (modules).

FIG. 3A is a diagram illustrating construction of a profile bitmap for tracking procedure hit rates for a given activity.

FIG. 3B is a diagram illustrating bit "signatures" which may be derived for each activity (from the profile bitmap 300).

FIG. 3C a diagram illustrating a multi-plane profile bitmap, which maintains a hit count for the procedures, for a given activity.

FIG. 3D is a diagram illustrating a hit count signature for each activity (which may be derived from the profile bitmap 360 of FIG. 3C).

FIG. 3E is a diagram illustrating an inverted analysis of the profile bitmap (of FIG. 3A), where an activity signature is determined for each procedure (i.e., an indicator of the activities each particular procedure has participated in). FIG. 3F is a block diagram illustrating clustering of procedures based on distinctive signature patterns of the procedures.

DETAILED DESCRIPTION OF A PREFERRED EMBODIMENT

The following description will focus on a preferred embodiment of the present invention which is operative in an environment supporting page-based virtual memory management, such as found in Intel 80×86-compatible systems. Such an environment loads information into system memory from disk in fixed-length blocks or "pages" (generally ranging from 4K, for example, to up to 64K or more). The present invention, however, is not limited to any particular application or any particular environment. Instead, those skilled in the art will find that the system and methods of the present invention may be advantageously applied to a variety of platforms and environments, particularly those where clustering of related procedures is of benefit. Therefore, the description of the exemplary embodiments which follows is for purposes of illustration and not limitation.

General Architecture

A. System Hardware

Figure 1A:
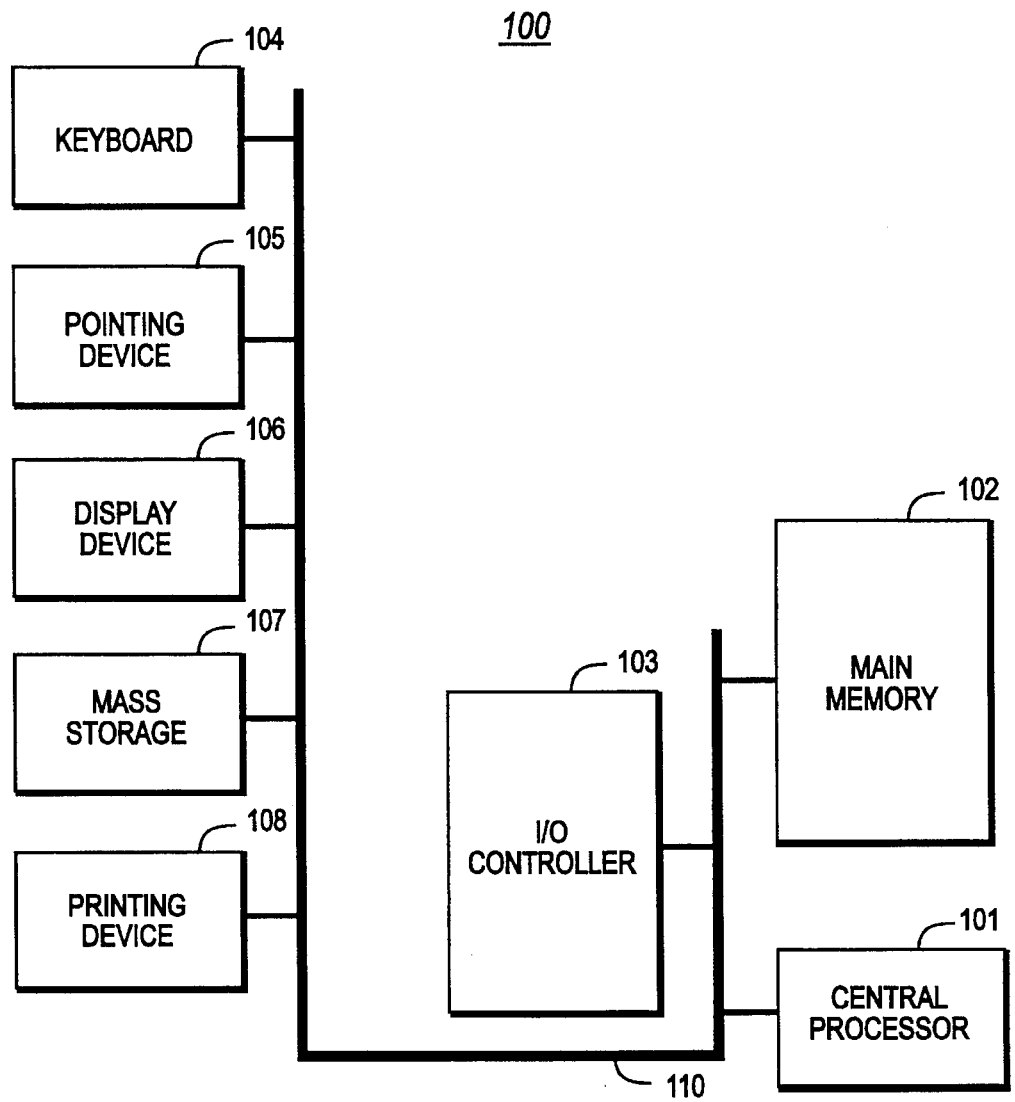
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Processor 101 includes or is coupled to a cache memory for storing frequently accessed information; cache memory may be an on-chip cache or external cache, as is known in the art. Additional input/output devices, such as a printing device 108, may be provided with the system 100 as desired. As shown, the various components of the system 100 communicate through a system bus 110 or similar architecture.

B. System Software

Figure 1B:
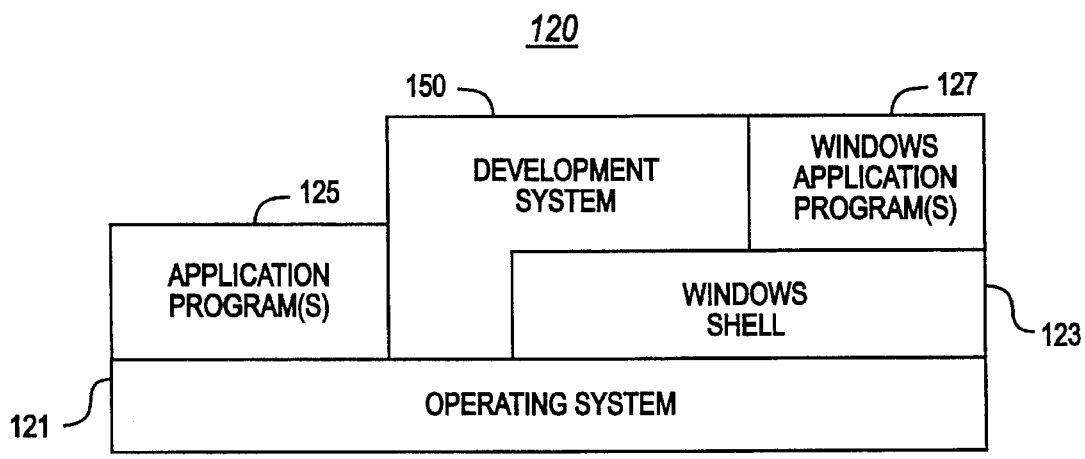
FIG. 1B is a block diagram of a software system for controlling the operation of the system of FIG. 1A.

Illustrated in FIG. 1B, a computer software system 120 is provided for programming the operation of the computer system 100. Software system 120, which is stored in system memory 102 and/or on disk memory 107, includes a kernel or operating system (OS) 121 and a windows shell or interface 123. One or more application programs, such as application programs 125 or windows applications program(s) 127, may be "loaded" (i.e., transferred from storage 107 into memory 102) for execution by the system 100. OS 121 and shell 123, as well as application software 125, 127 include an interface for receiving user commands and data and displaying results and other useful information. Software system 120 also includes a development system 150 of the present invention for developing system and application programs. As shown, the development system 150 includes components which interface with the system 100 through windows shell 123, as well as components which interface directly through OS 121.

In a preferred embodiment, the system 100 includes an IBM-compatible personal computer, available from a variety of vendors (including IBM of Armonk, N.Y.). Operating system 121 is MS-DOS and shell 123 is Microsoft® Windows, both of which are available from Microsoft Corporation of Redmond, Wash. Alternatively, the system 100 may be implemented in other platforms, including Macintosh, UNIX, and the like. Development systems 150 include Borland® C++, available from Borland International of Scotts Valley, Calif. Application software 125, 127, on the other hand, can be any one of a variety of application software, including word processing, database, spreadsheet, text editors, and the like.

C. Development System

Figure 1C:
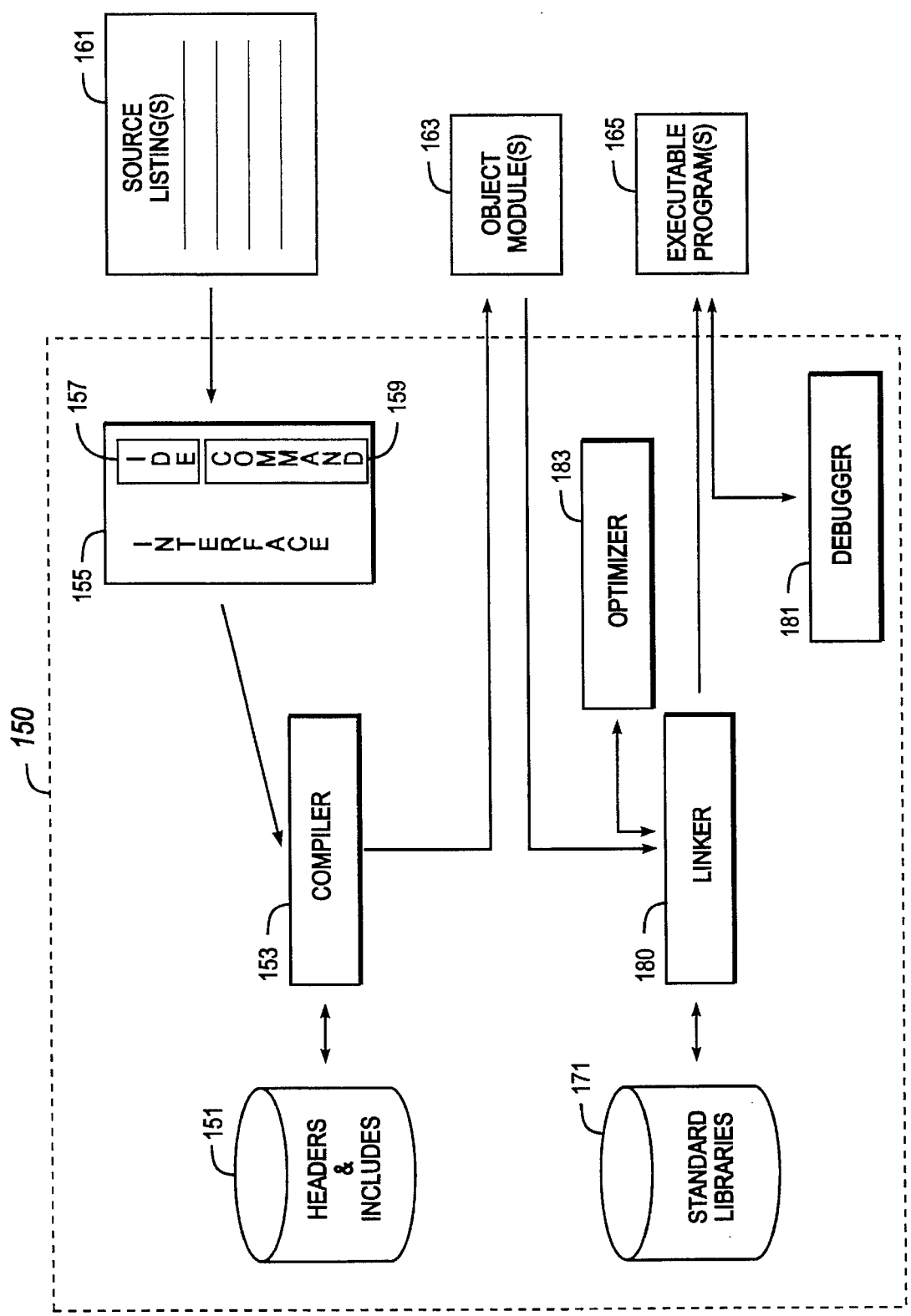
FIG. 1C is a block diagram of a development system of the present invention.

Shown in further detail in FIG. 1C, the development system 150 of the present invention includes a compiler 153, a linker 180, and an interface 155. Through the interface, the developer user supplies source modules 161 to the compiler 153. Interface 155 includes both command-line driven 159 and Integrated Development Environment (IDE) 157 interfaces, the former accepting user commands through command-line parameters, the latter providing menuing equivalents thereof. From the source code or listings 161 and headers/includes files 151, the compiler 153 "compiles" or generates object module(s) 163. In turn, linker 180 "links" or combines the object modules 163 with libraries 171 to generate program(s) 165, which may be executed by a target processor (e.g., processor 101 of FIG. 1A). The standard libraries 171 include previously-compiled standard routines, such as graphics, I/O routines, startup code, math libraries and the like. The user developer may designate other libraries (e.g., custom libraries) whose code is to be linked into the target executable.

In a preferred embodiment, the compiler includes Borland® C++compiler. A description of the general operation of development system 150 is provided with Borland® C++, available directly from Borland International. In particular, the reader may consult the following manuals: (1) *Borland C++User's Guide*, (2) *Borland C++Programmer's Guide*, and (3) *Borland C++Tools and Utilities Guide*, all available from Borland International. For additional discussion of the compiler, the reader may consult U.S. patent application Ser. No. 07/894,706, commonly owned by the present assignee. For a general introduction to the construction and operation of compilers, see Fischer et al., *Crafting a Compiler with C*, Benjamin/Cummings Publishing Company, Inc., 1991. The disclosures of each of the foregoing are hereby incorporated by reference.

A debugging module 181 is provided for tracking and eliminating errors in the programs 165. During compilation of a program, a developer user may specify that the program is to be compiled with "debug info." Debug info is used by the debugger 181 for tracking execution of the debuggee with the corresponding source listings. The general construction and operation of debuggers is well described in the technical, trade, and patent literature. See e.g., Pietrek, M., *Writing a Windows Debugger*, Windows/DOS Developer's Journal, pp. 6–12, June 1992. Particular user operation of the debugger 181 is described in Borland C++: *User Guide*, Chapter 6: Using the integrated debugger, Part No. BCP1240WW21770, Borland International, 1993. Formats for debug info are described in the technical literature; see e.g., Borland Languages: *Open Architecture Handbook*, Part No. 14MN-RCH01-10, Borland International, 1991.

As shown, the system 150 also includes an Optimizer module 183 of the present invention. Before describing the construction and operation of the Optimizer 183, it is helpful to briefly review the relationship between coded procedures (functions or routines) set forth in one's initial source code and executable procedures as they reside in executable code modules. This relationship is perhaps best understood by tracing the genesis of a program from source code listings to object code modules, and then finally to an executable (binary) program image.

Genesis of an Executable Program

A. Object (OBJ) Modules

During creation of a program, individual translator outputs (i.e., outputs from compilers and assemblers) are linked together to create the executable program. The translator outputs or object modules ("OBJs") store a plurality of records describing the object language (e.g., Intel 80×86) used for input and output of object language processors, such as linkers and librarians. The basic layout of an 80×86 OBJ module and its records is defined by the Intel Object Module Format (OMF). The order of the records is to some extent arbitrary.

For a detailed discussion of the Object Module Format standard, including Microsoft's extensions, the reader should consult: (1) 8086 *Relocatable Object Module Formats*, Intel Corporation, 1981; (2) *Microsoft C Developer's Toolkit Reference*, Microsoft Corporation, 1990; and (3) *The MS-DOS Encyclopedia*, Microsoft Press, 1988. The disclosures of each of the foregoing are hereby incorporated by reference.

B. Sample source and object files

Figure 2B:
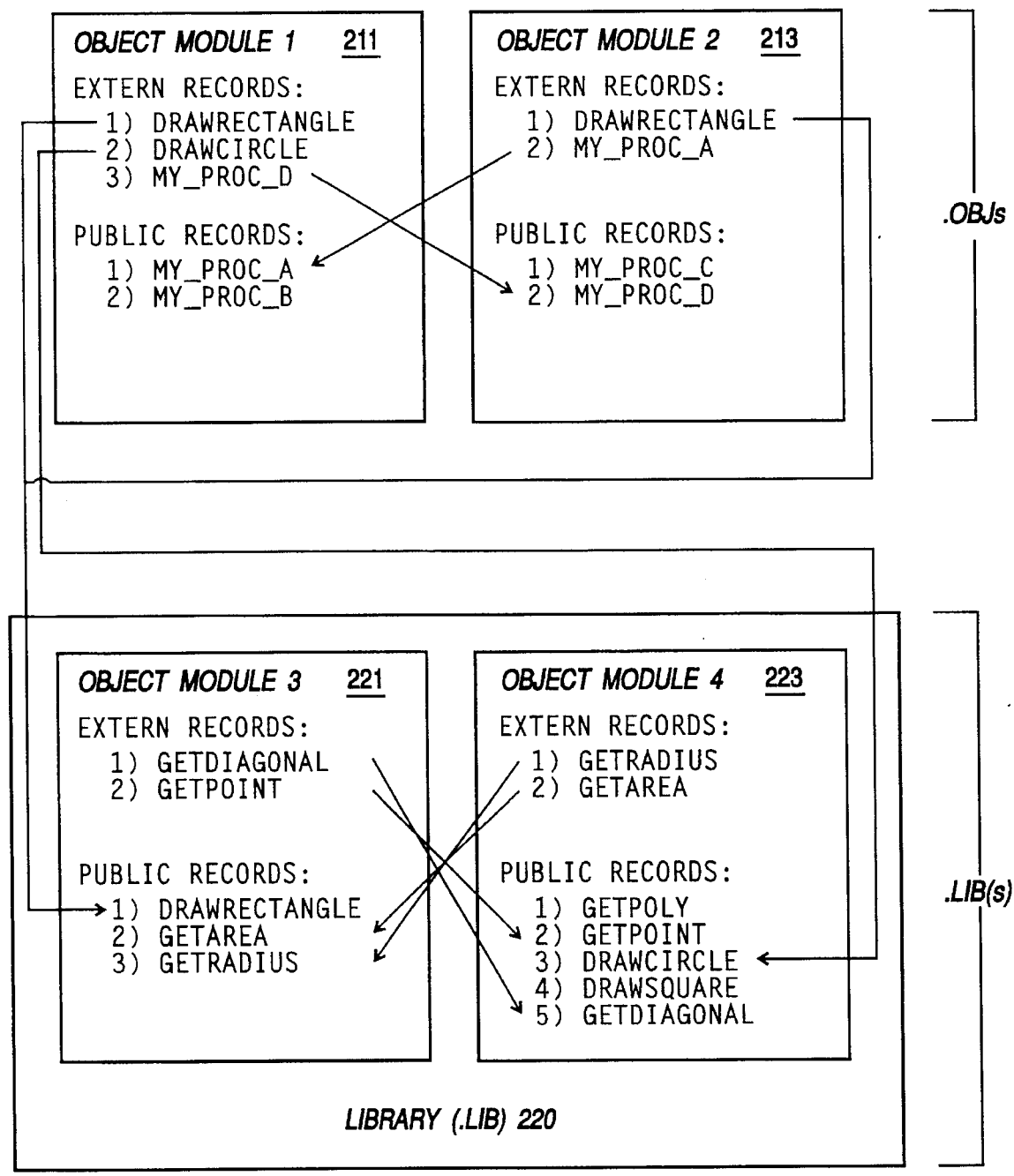
FIG. 2B is a block diagram illustrating various dependencies between procedures which may exist (among object modules and/or libraries).

The relationship between various source modules and their corresponding object modules is illustrated in FIGS. 2A–B. Source modules 201, 203 illustrate typical source code modules, such as would be supplied to the compiler 153 for generating modules of object code. Each module 201, 203 includes certain symbols which are "external" to the module and others which may be "public" to the module. In source 201, for instance, the routine MY_PROC_A is defined in that source module. As such, the routine is available for use globally (i.e., "public" visibility) within the source module 201.

Often, however, it is desirable to invoke routines which may be defined elsewhere (e.g., such as in a library file purchased from a third party vendor). As shown for the MY_PROC_A routine, for instance, a DRAWRECTANGLE routine is called. However, the DRAWRECTANGLE routine is defined elsewhere (i.e., the actual steps for the routine are set forth in a different module). Thus, the symbol "DRAWRECTANGLE" is "external" to the source module 201.

As shown by the object modules 211–213, the compiler 153 emits a particular (OMF) record for a symbol, based upon whether it is an external or public reference. As shown for the object module 211, for example, references to DRAWRECTANGLE, DRAWCIRCLE, and MY_PROC_D are stored in the object modules as external records. On the other hand, the two routines defined in source module 201—MY_PROC_A and MY_PROC_B—are stored as public records. The object module which source module 203 compiles into is also shown (as object module 213).

All told, there are dependencies between the various modules which exist. FIG. 2B illustrates dependencies 250 which may exist, for example, for the object modules 211, 213. Source module 201 generates object module 211. The module 211 includes three external references: 1) DRAWRECTANGLE, 2) DRAWCIRCLE, and 3) MY_PROC_D. The first two externals are satisfied by a library file 220, which itself is comprised of a plurality of object modules (e.g., object modules 221, 223). As is known in the art, a library essentially comprises a collection of object modules; an exemplary library format is that provided by Microsoft for MS-DOS (see e.g., *The MS-DOS Encyclopedia*, Microsoft Press, 1988). The third external reference (MY_PROC_D) is satisfied by the companion object module 213; that is, the module 213 includes a public record for MY_PROC_D which satisfies the corresponding external record for the object module 211. As shown by FIG. 2B, a multitude of interdependencies may exist, all of which must be satisfied during linking to create a valid executable program.

C. Emitting an Executable Image (Linking)

From the object file(s) and library file(s), an executable program may finally be generated. In general operation, a linker, such as linker 180, proceeds to scan the object module files desired to be included in the link operation. The linker also scans the object modules contained in any library files which have been specified to be included in the link. The linker gathers sufficient information to determine requirements for creating the executable, such as memory resources which are required by internal tables for the link operation.

After processing all of the object module files and library files, the linker determines which of the object modules contained in the library files are actually necessary to the link. A module is marked as "needed" if it contains one or more public records (e.g., OMF PUBDEF Records) that have been referenced via an external record (e.g., OMF EXTDEF Record) in another object module. The linker may then proceed to reprocess all of the object modules contained in the object files and any of the object modules contained in the library files but only for those which were marked as "needed." Any object modules in libraries that are not needed are skipped (i.e., not read into memory). As the object modules are processed, the executable image (Program 165 of FIG. 1C) is constructed and emitted.

An executable image layout is illustrated in FIG. C. The binary image includes, among other things, one or more code segments for storing the machine instructions which define the particular procedures of the program. For instance, Code Segment$_1$ (260) includes the machine instructions for MY_PROC_A (261), beginning at offset 0000. MY_PROC_A is followed by MY_PROC_B at offset 1377; it, in turn, is followed by MY_PROC_FOO, beginning at offset 5499.

Figure 2C:
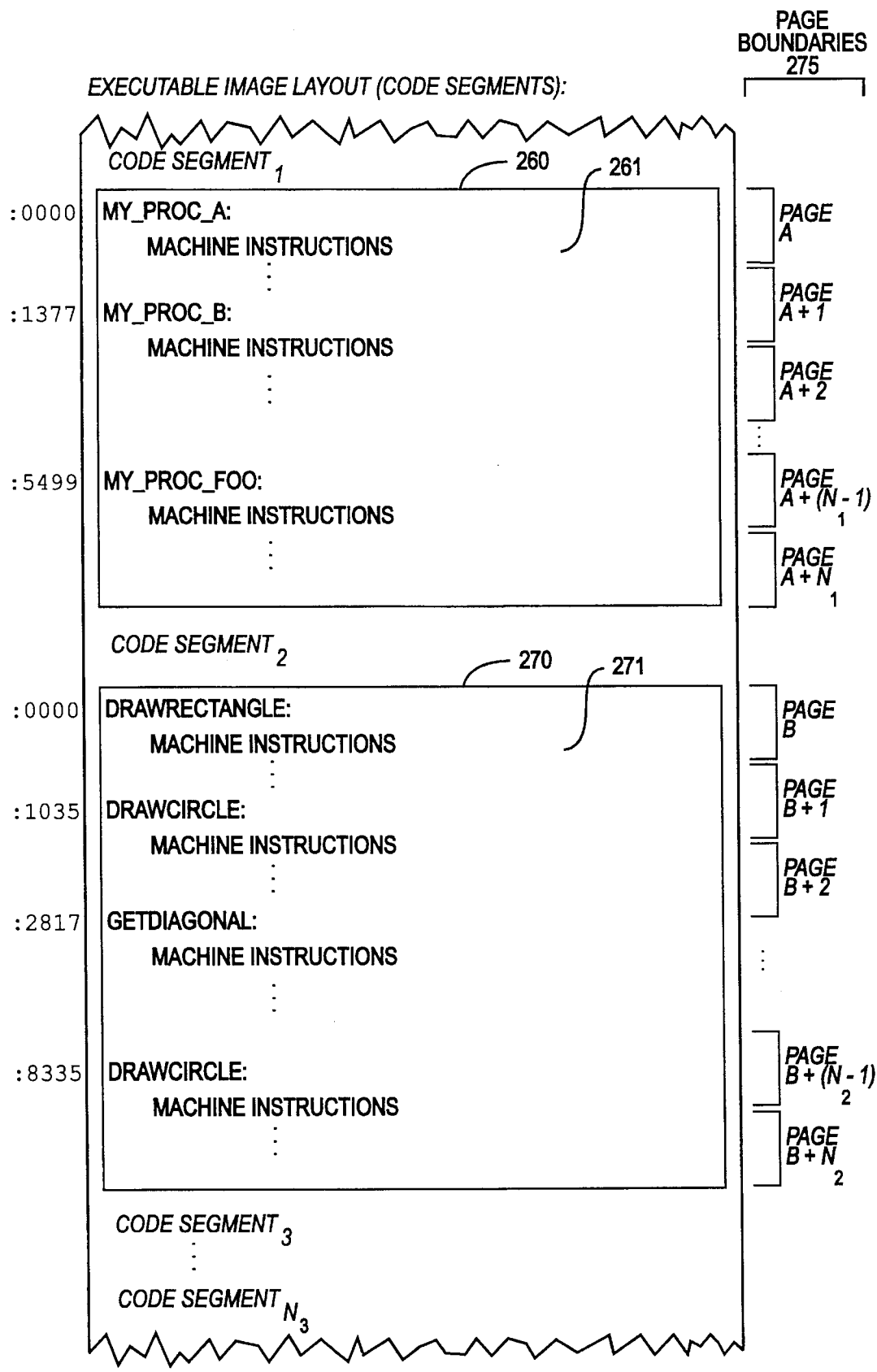
FIG. 2C is a block diagram illustrating typical placement of machine code for procedures in an executable program.

Code Segment$_1$ (260) may be followed by additional code segments, such as Code Segment$_2$ (270). In a manner similar to that described for Code Segments, Code Segment$_2$ comprises machine instructions for a plurality of procedures, such as the DRAWRECTANGLE procedure 271, which begins at offset 0000. Thus as shown by FIG. 2C, the routines from the object modules and/or libraries are ultimately placed in an executable program. It is the relative arrangement of the routines, with respect to one another, which impacts ultimate program performance and is therefore of particular interest to the present invention.

Also shown in FIG. 2C, the program code may be divided into a sequence of "pages" boundaries 275. To understand pages and page boundaries, it is helpful to first review generally how a computer system manages memory resources. In this manner, the methods of the present invention for optimizing placement of procedures within an executable program may be better understood.

Virtual Memory and Program Memory Management

The memory of most computer systems has associated with it a logical memory structure or layout. This is ultimately mapped into a physical memory layout, which is organized as a series of storage units (e.g., bytes). Thus, a software program views memory not in terms of physical memory but as logical memory or "virtual memory."

In order to provide more memory than is physically available, virtual memory does not correspond directly with the physical memory structure. For instance, the number of physical addresses on a particular computer is limited by how much memory the computer has; the number of virtual addresses, on the other hand, is limited only by the number of addresses available in the virtual address space. A system that supports a 32-bit virtual address space, for instance, may provide $2^{32}$ or 4 gigabytes of virtual memory (despite the fact that the amount of available physical memory is substantially less).

A virtual address space is, therefore, a set of logical memory addresses available for a program to use. Typically, the virtual address space is divided into blocks of equal size called "pages." Likewise, physical memory is divided into blocks called page frames, which are used to hold pages. Thus the virtual address space is divided up into units called pages which are translated or mapped into corresponding units or page frames in the physical memory. Pages and page frames always retain the same size, with a size of 4K being fairly typical for an 80×86-compatible system. Page size for modern operating systems, however, can be quite large (e.g., 64K for Microsoft® Windows NT).

For providing more virtual memory than is available from physical memory, a scheme is required for swapping out pages to a storage device (e.g., device 107 of FIG. 1A). In a typical hardware implementation, virtual pages are tracked in a page table, with each entry in the table having a "present/absent" bit for indicating whether a particular page is mapped or not (i.e., present in physical memory). When a program tries to use an unmapped page, a "page fault" is trapped to the operating system. The operating system fetches the page just referenced into a page frame just freed (according to one of many possible algorithms), changes the map, and restarts the trapped instruction. Thus, using tables called page tables, the linear address undergoes a translation to a physical address.

In some systems, pages may also be provided with additional flags for controlling page protection. For example, a page may be set to read-only which will allow that page to be examined, but not written to. Controlling page-level protection can lead to more reliable programs by ensuring that a process does not accidentally write to pages that should be read-only, such as locations reserved for code. Any time a process attempts to access a memory page which it is not allowed access to, an exception occurs. As a result, execution of the program temporarily ceases while the operating system services the exception.

For a general introduction to virtual memory systems, see Tanenbaum, A., *Operating Systems: Design and Implementation*, pp. 206–212, 1987. For a comprehensive introduction to memory management services of a multi-tasking operating system, such as Microsoft Windows NT, see Yao, P., *An Introduction to Windows NT Memory Management Fundamentals*, Microsoft System Journal, pp. 41–49, July—August 1992. The disclosures of the foregoing references are incorporated herein by reference for all purposes.

Optimized Code Packing

A. Introduction

Consider the code arrangement for present-day commercial applications. If one were to run across a spectrum of features in a program, say, Paradox® for Windows or Lotus®1-2-3, one would get a profile of what code is needed for everyday operation of the program. The actual number of procedures touched by such a sweep is typically on the order of about 40% of the total number of procedures. With conventional methodology, however, there is often little correlation between such usage (by the user) and actual placement of procedures in the executable program code. In order to use the approximate 40% of procedures touched in Lotus 1-2-3, for instance, one would have to load nearly every segment and every page in the product—several megabytes, instead of just one or two megabytes.

The example may be simplified by focusing on a single activity in a simple program. Consider, for instance, a program having just ten activities with one of activities—Activity A—using only ten percent of all available procedures. If those procedures required by Activity A are evenly scattered throughout all of the program's code, then for Activity A to run each page of code of the program must be read into system memory. In other words, the entire code set for the program must be read into memory to complete Activity A, despite the fact that Activity A only requires ten percent of that code set.

By grouping or clustering together related procedures (e.g., those for Activity A), however, programs may be made to load faster, change activity more responsively, and run in a smaller memory space. It is therefore highly desirable to optimize the arrangement of procedures within a program in order to minimize, for a given task, the swapping of pages from a storage device. Moreover, for segmented-memory architecture (e.g., Intel 80×86; systems), it is desirable to optimize the arrangement of procedures within a program in order to minimize the number of intersegment or "far" calls (which are computationally more expensive). By optimizing the relative placement of procedures within an executable image, the Optimizer 183 of the present invention provides an efficient mechanism for achieving these goals, thereby improving program performance and conserving system resources.

B. General Operation

The general operation of the Optimizer 183 proceeds as follows. Every procedure within the program of interest is assigned a slot, such as through using debug information. Alternatively, system memory may be divided up into small slots (some of which will not correspond to procedures), with marking of those slots which correspond to procedure entry points. For instance, as procedures tend to be greater than at least 16 bytes, slots of 16-byte boundaries may be employed. Actual determination of which procedure entry points correspond to which slots may be deferred until after a test run (described below), instead of at runtime. The function prolog code emitted by the compiler may be modified so that at the entry of each procedure a call is made to a special handler. This modification is not unlike the present-day approach employed for stack checking by the compiler (where a call to a check routine is made upon entering a function).

Next, the run of the program is divided into a plurality of activity slots. Each slot, in turn, corresponds to a distinct program activity, such as opening a file, dragging an icon around, and the like. More particularly, the activities are those which are everyday activities important to the operation of the program. In other words, an activity profile is created which tracks the various tasks which are core to the operation of the program. For a database program, such activities may include, for instance, sorting a database table, printing a report, and the like. For a painting program, on the other hand, such activities may include, for instance, saving a bitmap file, modifying a color palette, cutting/pasting bitmaps, and the like. Regardless of program type, however, the target program is effectively "sliced" into various activities.

In a preferred embodiment, the number of such activities derived need not be large but may, instead, be on the order of about two to three dozen activities. In a preferred embodiment, one employing Intel 80×86 architecture, the number of activities is set equal to a multiple of the underlying machine word (e.g., 32), for efficient use of machine architecture. Other numbers of bits may be employed, if desired, including for instance 8-bit, 16-bit, 64-bit, and 128-bit quantities. Preferably, the size of the bit set is not set too large. Otherwise, the signature patterns (described below) will tend to have a correspondingly larger number of "noise" bits.

As illustrated in FIG. 3A, after a run of the program a profile bitmap 300 is generated. As shown, for each activity a corresponding bit set is generated. For Activity #1, which may be for instance the task of saving a file to disk, the bit set 310 is generated. Each "hit" in the bit set (i.e., bits in the bit set which have been set to "high" or "1") represents a call made to a corresponding procedure of the program, for carrying out the activity. For Activity #1, for instance, Procedures #2 and #5 are called. By way of example, if Activity #1 represents the task of saving a file, Procedure #2 may be a routine for retrieving a file handle from the operating system and Procedure #5 may be a routine for writing a block of information to disk (for the file handle retrieved by Procedure #2).

As shown in FIG. 3B, bit slices may be taken from the bitmap so that a bit signature may be determined for each activity. This bit signature, in turn, represents a procedure footprint for the activity—an indicator of which procedures were invoked during processing of the activity.

As shown in FIGS. 3C–D, the profile bitmap of the present invention may be modified for tracking a plurality of reference counts. Profile bitmap 360 is a multi-plane bitmap (i.e., there exists more than one bit for each activity/procedure slot in the bitmap). The depth of the multi-plane bitmap 360 may, for instance, be set to 16 bits (24) or 32 bits (25).

In a manner similar to that shown for the profile bitmap 300, an activity slice (e.g., slice 370) may be taken through the bitmap for obtaining a signature for a given activity. Signatures for the various activities of bitmap 360 are shown in FIG. 3D, as signatures 380. Upon reviewing the signatures 380, it is apparent that additional information has been preserved. In particular, an indicator of how dependent a particular activity is on a given procedure may readily be determined. Activity #4, for instance, is heavily dependent on Procedure #5. Activity #5, in contrast, depends on Procedure #5 to a much lesser extent.

Although the multi-plane variant provides additional information, much of the desired profiling information may be obtained from looking at the hit signatures for profile bitmap 300. The reason for this is that the majority of optimization information desired is encoded in the signature. Assigning relative weights to individual bit members of the signature (although it includes additional information) does not alter the basic dependencies which exist between an activity and its requisite procedures.

During recording (testing) of a program run, it is generally preferable to track the bits on a column-wise basis. In particular, as there may be a fairly large set of bits for a given bitmap, it is advantageous to record the procedure hits (or counts) for a given activity and then flush that bit column to a desired destination (e.g., large-capacity storage device). In this manner, a relatively small number of bits (e.g., a single bit column) need only be maintained in system memory at a given time; accordingly, available memory resources are conserved. This is particularly advantageous when one considers that additional memory resources are required for storing the recording procedure which tracks the procedure calls made during operation of a particular activity.

At the conclusion of the reporting, a bitmap has been built up, such as the bitmap 300 of FIG. 3A. The analysis of the results is inverted, as shown in FIG. 3E. For each procedure, a signature is generated indicating which activities the procedure has participated in. In other words, for each procedure a bit pattern is generated which is a signature of N (activities) bits wide, such as 32 bits (as shown for the example of FIG. 3A). As discussed earlier, the number of activities will typically be a small number, such as 16 or 32 (bits), or a similar quantity which fits neatly into machine words (of the underlying architecture).

Given a 32-bit signature—that is, 32 activities to track—one could, in theory, have up to four billion ($2^{32}$) patterns. In other words, it is theoretically possible for every procedure to have a distinctive pattern. The present invention recognizes, however, that the actual number of unique signatures generated tends to be far fewer than theoretically possible. Instead, the tendency is towards very few signatures and many repeating signatures (between procedures), such as clustered signatures 357 illustrated in FIG. 3F. Recognizing this, the present invention provides a substantially more efficient technique for identifying procedures which should be clustered together. In particular, procedures which share a particular signature (pattern) are candidates for clustering together.

C. Code Packing Optimization Method

Figure 4:
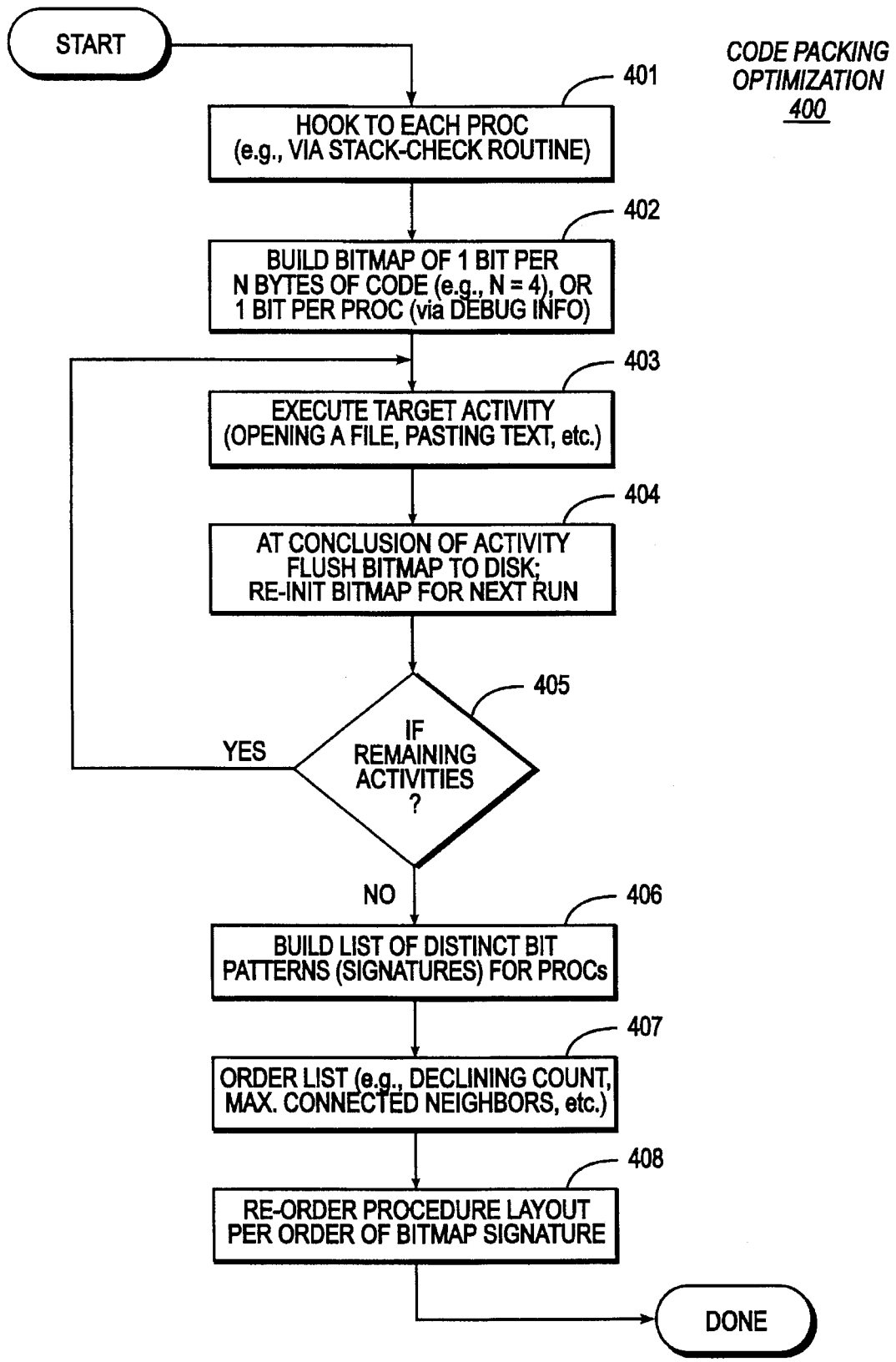
FIG. 4 is a flow chart illustrating a method of the present invention for optimizing the packing of code in executable programs.

Referring now to FIG. 4, a method of the present invention for organizing code for close packing is summarized. At step 401, profile information for each procedure is gathered as follows. Entry into the procedure is trapped, for example, by hooking an existing stack-check routine. At step 402, a bitmap is built of one bit per N bytes of code (e.g., N=4); alternatively, one bit is assigned per procedure via debug info. The actual hits are gathered at runtime in a set of "shadow segments." In a preferred embodiment, hit logging may be switched on or off, as desired. When it is switched off, the contents of the (just-recorded) bitmap are written to disk and the bitmap is reinitialized (hits are zeroed) to allow further testing (as described below).

At step 403, the program of interest is run through characteristic (everyday) activities, such as printing a file, copying/pasting text, sorting a database table, and the like. As shown at step 404, between each activity, hit logging is switched off and on again, to write out a separate hit map for each activity. This process is repeated until a broad sample of the target program has been exercised, as shown at step 405.

At step 406, the results are analyzed as follows. The symbols for the program are read in (e.g., from debug information) and then correlated against the hits in the bitmaps. For each symbol, a bitmap signature is built up, where the Nth bit set represents usage for the Nth activity. In typical use, the bitmaps are highly correlated, so that one can easily see that there may be as few as fifty different patterns with twelve activities in a large commercial application (e.g., Paradox for Windows or Lotus 1-2-3). At the conclusion of the step, a list is constructed of all distinct bit patterns.

At step 407, the patterns are ordered in declining count (of how many bits are set), or by arranging for neighbors to be maximally connected, or by arranging for global maximization of connectivity, or some combination thereof. Finally, given the ordering (e.g., ordering shown in FIG. 3F), the procedures may be relocated by arranging them according to the order of their bitmap signatures, as indicated at step 408. The overall process may be particularly automated for 32-bit flat model where moving procedures around causes no near/far problems and results in near optimal packing.

In a most preferred embodiment, clustering is configured at the link stage. In particular, the Optimizer, after it has completed its analysis, generates an ordered list of procedures (via function names), where the order specifies how the procedures are to be placed by the linker into the target executable. There is no requirement that the list be complete (i.e., include all procedures). Any function or procedure omitted from the list may be placed in a conventional way, such as the order in which the linker encounters it in an .OBJ file.

Between the clusters of procedures themselves, a weighting may be assigned to further influence the ultimate packing of procedure clusters. In other words, the activities themselves may be prioritized (e.g., according to importance to the user). This prioritization would then, in turn, be reflected in the final packing of the procedures.

The clustering of procedures allows one to readily identify groups of related procedures so that they may be grouped (in the target executable) so that they are contiguous or nearly contiguous in the page order. The end result of the process is a list of procedures in the order that they are desired to be packed by the linker. The page ordering is arranged so that the working set (set of memory pages) is optimized for the activity at hand. In this manner, procedures for a given task will be arranged as related (neighboring) pages of the program. Therefore, for a particular activity, the working set of pages comprises a cluster of pages storing the related procedures (as determined by their bit signatures). At runtime, increased program performance (speed) may be realized from the resulting smaller working set required for executing a particular task. The smaller working set affords more memory for data and generally leads to less competition between programs for finite system memory. Moreover, a contiguous-page working set helps because when a mass storage device (e.g., device 107) is retrieving the working set from disk, the disk head requires substantially less movement (as it may complete its operation in a single read operation); also, caching and look-ahead techniques (typically, implemented in hardware controllers) will tend to have a much higher success rate.

The present invention ensures that any page loaded into memory contributes a lot to the activity at hand (i.e., many related routines are being loaded). Routines that are infrequently used, on the other hand, are equally clustered somewhere else, so that they may be left on disk until required. This approach is particularly advantageous for operating systems which have substantially large page sizes (e.g., 64K for DEC Alpha operating system).

Figure 5:
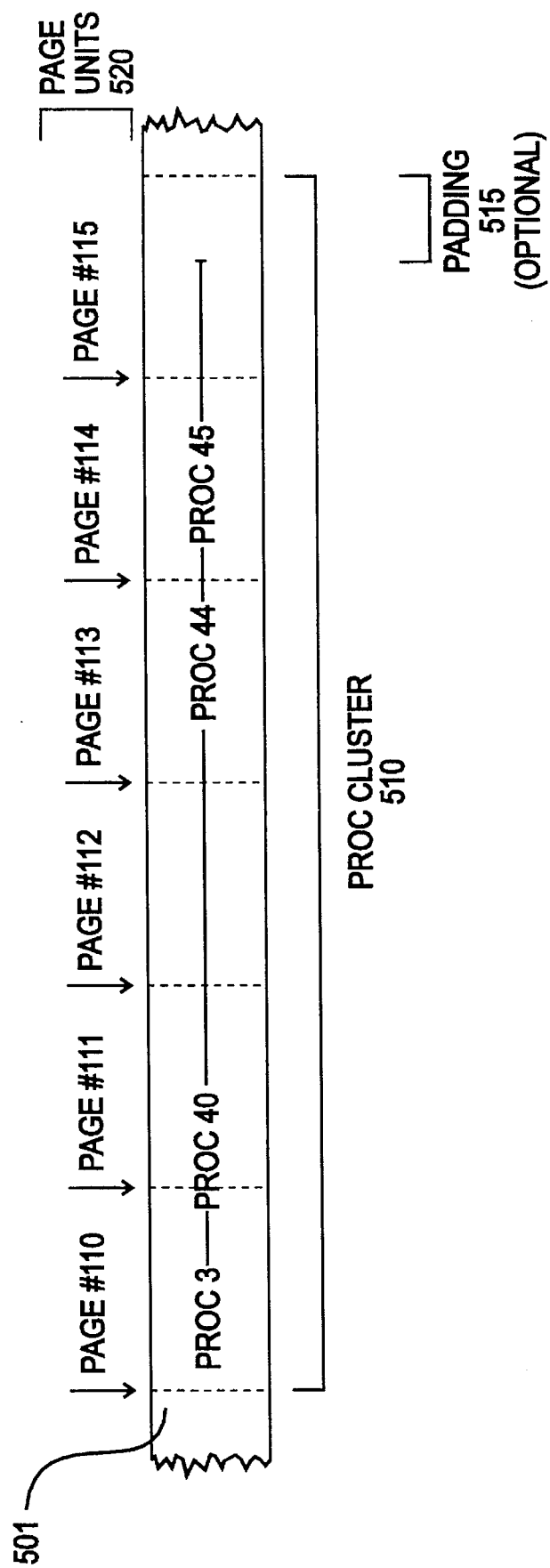
FIG. 5 is a block diagram illustrating page layout (in the packed code of an the executable program) of procedures which comprise a particular procedure cluster.

FIG. 5 illustrates an exemplary code portion 501 from an executable program's packed code 500. As shown, the procedures of procedure cluster 510 (i.e., proc 3, proc 40, proc 44, and proc 45 from Cluster C in FIG. 3F) are packed into contiguous page units 520, thereby allowing the particular activity associated with the cluster to be performed with maximum speed and efficiency. If desired, padding 515 may be (optionally) added between procedure clusters, so that each cluster begins on a page boundary. As previously discussed, the actual size of the pages is not particularly relevant and will generally vary from one hardware/operating system platform to another. What is relevant, however, is that the related procedures are stored in contiguous or near-contiguous page units, so that the efficiency of information retrieval operations (e.g., disk access, caching, and the like) are maximized.

Advantages

The approach of the present invention, which employs activity-based analysis, is particularly efficient when compared against time slice-based mechanisms. Consider, for instance, a time slice-based analysis of a program comprising 20,000 procedures (a modest number by modern standards). If the test were run for one minute at a sampling rate of ten times per second, a data set of 12,000,000 bits is generated (60 sec×10 times/sec×20,000). For just a single procedure, hundreds of bits are generated. And this is just for one minute's worth of analysis. As such, the time slice-based approach yields an enormous set of data to analyze. Applying conventional analytical methodology, such as "rubber-banding" or least distance analysis, for processing the data set would requires several hours, for even a program of modest size. For large-scale commercial applications, on the other hand, the time required for analysis is not even practical (as such analyses tend to be exponential in nature).

The approach of the present invention, in contrast, greatly simplifies the data set required for analysis by basing the data set on meaningful program activities, instead of time slices which have no particular correlation to operation of the program. Moreover, as time slice-based samples are arbitrary (i.e., not based on any particular task or activity) there generally tends to be little clustering of time-slice bit signatures and, hence, little opportunity for simplifying data sets. The present invention, on the other hand, has a particular advantage of reducing the data set to just a few hundred signatures for a program having ten to twenty thousand procedures. In this manner, a data set which would have required hours or more for analysis and is reduced to one that may be analyzed in fractions of a second. Also, as the present invention takes into account activities that are important to everyday use of the program, better end results are obtained: the result that is really sought by optimization techniques is for the particular activities which comprise a program to run fast.

While the invention is described in some detail with specific reference to a single preferred embodiment and certain alternatives, there is no intent to limit the invention to that particular embodiment or those specific alternatives. For instance, those skilled in the art will appreciate that the teachings of the present invention may be advantageously applied to data objects, in addition to code objects. In particular, a profile of data objects required for a given activity may be obtained by trapping access to the data objects (e.g., using the previously-described memory protection scheme afforded by virtual memory management systems). The data objects may then be clustered based on repeating groups of signatures, as previously described for code objects. Thus, the true scope of the present invention is not limited to any one of the foregoing exemplary embodiments but is instead defined by the following claims.

What is claimed is:

1. In a system for operating computer programs, said programs comprising machine code having a plurality of procedures, a method for optimizing placement of procedures within a target program, the method comprising:

(a) dividing execution of said target program into a plurality of activities which are based on operation of said target program by an end user, each of said activities requiring invocation of at least one procedure of said target program for completion of said each activity;

(b) for each of said activities, executing said target program and at completion of said each activity, storing profile information for indicating which procedures of said target program were invoked for completion of said each activity; and (c) placing procedures which are invoked for a particular set of activities in contiguous locations of said target program, based on said profile information stored for each activity.

2. The method of claim 1, wherein said activities are selected to represent core activities for operating said target program.

3. The method of claim 1, wherein said activities include user-invoked tasks of said target program.

4. The method of claim 1, wherein said plurality of activities comprises N number of activities, wherein N number of bits comprises a machine-word storage unit or multiple thereof.

5. The method of claim 4, wherein said machine-word storage unit is a selected one of an 8-bit unit, a 16-bit unit, a 32-bit unit, a 64-bit unit, and a 128-bit unit.

6. The method of claim 1, wherein said invocation of at least one procedure includes transferring program control to the procedure and executing machine code which comprises the procedure.

7. The method of claim 1, wherein said profile information comprises a profile bitmap, said profile bitmap providing a mapping between an activity and corresponding ones of said procedures required to complete said each activity.

8. The method of claim 1, wherein said profile information stores a reference count for each procedure for indicating how many times a particular procedure was invoked for each activity.

9. The method of claim 7, wherein said profile bitmap comprises a plurality of activity bit slices, each of said activity bit slices for identifying which of said procedures were invoked to complete a corresponding activity.

10. The method of claim 9, wherein step (c) includes:

inverting said activity bit slices so that a bit signature is obtained for each procedure, for indicating which activities each procedure has been invoked for; and ordering the bit signatures so that procedures having identical bit signatures are clustered together.

11. The method of claim 10, wherein said ordering of bit signatures is based on a declining count of how many bits are set in each signature.

12. The method of claim 10, wherein said ordering of bit signatures is based on maximization of connectivity of neighboring bit signatures.

13. The method of claim 10, wherein said ordering of bit signatures is based on global maximization of connectivity between bit signatures.

14. The method of claim 1, wherein said target program is arranged in units of fixed-length pages, and wherein step (c) includes clustering procedures which are invoked for a particular set of activities into contiguous or near-contiguous pages of said target program.

15. The method of claim 14, wherein step (c) further includes padding pages as needed so that each group of clustered procedures begins on a page boundary.

16. In a development system for creating a computer program, said computer program comprising routines executable by a microprocessor, a method for optimizing ordering of said routines in the computer program, the method comprising:

(a) dividing the program into a plurality of discrete activities, each activity representing a particular task of the program which occurs during actual use of the program by a user;

(b) for each activity, generating a corresponding bit set, each bit in the bit set representing whether a call has been made to a particular routine during execution of said each activity;

(c) determining a bit signature for each activity, each bit in said bit signature identifying which particular routines of the program have been called during execution of said each activity;

(d) generating an ordered list of all bit signatures, for identifying which particular routines of the program are related based on activity; and (e) ordering said routines in the computer program according to said ordered list.

17. The method of claim 16, wherein step (b) includes:

for each activity, writing the corresponding bit set to a mass storage device upon completion of said each activity.

18. The method of claim 16, wherein said activities include tasks which are core to everyday operation of the program.

19. The method of claim 16, wherein step (b) includes:

storing a handler routine for detecting when execution has begun for each routine of the program; and upon detecting that execution has begun for a particular routine for a currently executing activity, setting a corresponding bit in the bit set of said currently executing activity for representing that a call has been made to the particular routine during execution of said activity.

20. The method of claim 19, wherein said handler routine is invoked during execution of prologue code for each routine of the program.

21. The method of claim 19, wherein said handler routine is invoked in conjunction with a check routine which tests each routine of the program for memory stack overflow.

22. The method of claim 16, wherein step (d) includes:

generating an ordered list of all bit signatures based on a declining count of how many bits are set in each signature.

23. The method of claim 16, wherein step (d) includes:

generating an ordered list of all bit signatures based on maximization of connectivity of neighboring bit signatures.

24. The method of claim 16, wherein step (d) includes:

generating an ordered list of all bit signatures based on global maximization of connectivity between bit signatures.

25. The method of claim 16, wherein each routine of the program is stored at one or more sequential page units, and wherein step (e) includes:

ordering said routines in the computer program according to said ordered list, so that routines sharing an identical bit signature are stored contiguously in said page units of the program.

26. The method of claim 16, wherein routines of the program are stored in one or more code segments of the program, and wherein step (e) includes:

ordering said routines in the computer program according to said ordered list, so that routines sharing an identical bit signature are stored contiguously in a particular code segment of the program.

27. The method of claim 16, wherein step (a) includes:

dividing the program into N number of discrete activities, wherein N number of bits comprises a machine-word storage unit or multiple thereof.

28. The method of claim 16, further comprising:

assigning a weighting to each activity for indicating importance of said each activity to execution of the program, so that in step (e), said ordering of said routines in the computer program is based on said ordered list and on said weighting assigned to each activity.

29. The method of claim 28, wherein the program includes a working set comprising routines of the program present in system memory, and wherein said working set for the program initially comprises routines for activities which are more important to execution of the program, as specified by said weighting.

30. The method of claim 16, wherein said activities include user-observable tasks of said target program.

* * * * *